Patented Feb. 13, 1951

2,541,088

UNITED STATES PATENT OFFICE 2,541,088

PROCESS FOR PREPARING N-ALKYL SUBSTITUTED N,N - BETA,BETA'-DIALKANOLAMINES

Edward Joseph Nikawitz, Passaic, N. J., assignor to Burton T. Bush, Inc., New York, N. Y., a corporation of New Jersey No Drawing. Application December 5, 1946, Serial No. 714,134

10 Claims. (Cl. 260—584)

This invention relates to a process for preparing higher molecular N-alkyl-substituted N,N-beta,beta'-dialkanolamines. These compounds may be represented according to their structural formula as follows:

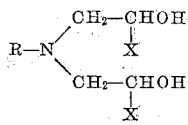

wherein R represents an alkyl radical having from eight to eighteen carbon atoms and X is H or $CH_3$.

The substances prepared in accordance with the process of this invention are technically useful. They may be employed as emulsifiers, textile softeners and insecticides.

In addition, the compounds prepared with the aid of the instant novel process are valuable as intermediates in preparing textile agents and substances having bactericidal and fungicidal properties.

In spite of the uses of the substances under discussion, it is noteworthy that no simple and commercially-feasible process exists for their preparation from alkyl halides and dialkanolamines. My present invention is directed to providing just such a process, characterized by high yields and short reaction periods.

Higher alkyl halides and N,N-beta,beta'-diethanolamine or N,N-beta,beta'-di-isopropanolamine are not miscible. Increasing the temperature to reflux conditions does not induce solution either. Consequently, it would be desirable to add a third material in order to effect solution of the reactants. It is to this feature that my present invention relates.

In general, my novel process involves heating higher molecular alkyl halides and N,N-beta,beta'-diethanolamine or N,N-beta,beta'-di-isopropanolamine in the presence of certain added materials. These added materials all have the property of acting as mutual solvents for the reactants. However, it is not sufficient merely to provide mutual solvents. This may be deduced from the facts that the use of isopropyl alcohol or isoamyl alcohol, to name just two mutual solvents which are unsatisfactory, results in very poor yields of the desired N-alkyl-substituted N,N-beta,beta'-dialyanolamines within short reaction periods.

Thus far, I have not been able to ascertain, by experimentation or otherwise, what additional quality, besides that of being a mutual solvent, the added materials must possess in order to enable me to obtain excellent yields within a short reaction period. Indeed, so far as I have been able to learn, there is no way of predicting in advance whether any given mutual solvent will also possess the additional property of enabling substantially-theoretical yields of N-alkyl-substituted N,N-beta,beta'-dialkanolamines to be obtained within reasonable reaction periods.

As added materials which have been found to give excellent yields in my process may be noted: benzyl alcohol, tetrahydro furfuryl alcohol, the mono-methyl ether of diethylene glycol, the mono-ethyl ether of diethylene glycol, phenyl ethyl alcohol, lower alkyl ring-substituted ($C_1$ to $C_4$) benzyl alcohols, beta-hydroxyethyl phenyl ether, mono-butyl ether of diethylene glycol, mono-ethyl butyl ether of ethylene glycol, and mono-butyl ether of ethylene glycol.

The alkyl halides I contemplate using in accordance with my invention are those wherein the alkyl radicals thereof contain from eight to eighteen carbon atoms. Thus, for example, are included octyl bromide, lauryl chloride, myristyl bromide, octadecyl chloride, and mixtures of two or more of these as well as other alkyl halides having eight to eighteen carbon atoms. It is also understood that my invention contemplates the use of alkyl iodides and fluorides, and is therefore not to be restricted to the bromides and chlorides.

In carrying out my process, it has been found that considerable latitude is permissible with regard to the ratio of the materials charged into the reaction chamber. Thus, eqimolecular amounts of the alkyl halide and N,N-beta,beta'-diethanolamine or N,N-beta,beta'-di-isopropanolamine with an amount of the added material just sufficient to insure complete solution at the reaction temperature may be employed. In such case, an equivalent amount of a tertiary amine, such as dimethylaniline, or other hydrogen halide fixing material, should be employed. Excellent results, however, have been obtained where 1 mol of the alkyl halide and 2 mols of N,N-beta,beta'-dialkanolamine have been used, the second mol of the amine acting as the hydrogen halide fixing agent. Obviously, if desired, more than the amount of added material just sufficient to insure solution may be employed.

The temperature at which my process may be effected may vary, depending on the materials treated, inter alia. It is preferred to conduct the reaction under reflux conditions, at atmospheric pressure, but, if desired, the reaction may also be conducted at elevated temperatures lower than reflux temperatures. In general, however, the higher the temperature the quicker a satisfactory yield of the desired product is obtained. Consequently, the reaction may even be conducted under superatmospheric pressure, at temperatures above normal boiling temperatures, if desired.

As will be understood by organic chemists, the time of the reaction, or reaction period, may be varied. The end point is normally when a substantially theoretical yield has been obtained, but, if desired, the reaction may be stopped before this point is reached. The temperature and pressure under which the reaction is conducted and the concentration of the starting materials are some other factors which govern the length of the reaction periods.

In specific cases I have found that the reaction is usually substantially complete in five minutes, but in most cases reaction periods from about one to fifteen minutes are found desirable.

As a practical matter, the extent of reaction may be followed by measuring the amount of ionized halogen found according to known methods. From the information obtained, the extent of reaction can be determined, also in known manner.

In order more fully to illustrate my novel process I am setting forth the following specific examples, which, however, are not intended to be construed as limiting the invention.

EXAMPLE I

Preparation of N-lauryl N,N-beta,beta'-diethanolamine 51.2 grams of lauryl chloride, having a boiling point of 128°–130° C. at 11 mm. Hg pressure, 53.0 grams of N,N - beta,beta' - diethanolamine of 99.4% purity, having a melting point of 25°–26° C., and 45 cc. of benzyl alcohol were refluxed for fifteen minutes under atmospheric pressure. After cooling down to 100° C., 11 grams of sodium hydroxide in 10 cc. of water and then 50 cc. of isopropyl alcohol were added. The contents were heated under reflux for ten minutes.

The solution, after standing at room temperature (about 25° C.) over night, was filtered off from the salt. The salt cake was washed with 30 cc. of isopropyl alcohol and this wash was added to the previous filtrate. The isopropyl alcohol was then distilled off from the combined solutions under low vacuum, substantially 80 cc. of the alcohol being recovered. The residue remaining after the removal of the ispropyl alcohol was distilled under high vacuum (3 mm. Hg pressure). Fractions, as follows, were obtained:

| Boiling Range | Amount | Material |
| --- | --- | --- |
| 85°–110° C | 43 cc | Benzyl Alcohol. |
| 135°–185° C | 23 grams | Diethanolamine. |

After these fractions had been distilled off, the residue in the distilling flask was a brown, thick oil, soluble in dilute mineral acids with vigorous foaming. Upon distillation under 3 mm. Hg pressure, 58 grams of substantially pure N-lauryl N,N - beta,beta'-diethanolamine were obtained. It boils at 190°–200° C. and it has a specific gravity of 0.9221 (25°/25°), a refractive index (20°) of 1.4675 and a congealing point of 17.2° C. This N-lauryl N,N-beta,beta'-diethanolamine may be employed as a textile agent. It can also be converted into quaternary ammonium compounds having germicidal properties.

EXAMPLE II

Preparation of N-lauryl N,N-beta,beta'-diethanolamine

Substantially the same results as those of Example I are obtained if a chemically-equivalent amount of lauryl bromide (boiling point 175°–180° C. at 45 mm. Hg pressure) is used in place of lauryl chloride, and the procedure of Example I is followed.

EXAMPLE III

Preparation of N-octadecyl N,N-beta,beta'-diethanolamine 28.9 grams of octadecyl chloride (boiling point 180°–183° C. at 12 mm. Hg pressure), 22.0 grams of N,N-beta,beta'-diethanolamine and 50 cc. of benzyl alcohol were refluxed for ten minutes under atmospheric pressure. There were then added 4 grams of sodium hydroxide in 10 cc. of water and 150 cc. of Formula #30 denatured alcohol, and the contents refluxed for five minutes.

The salt which formed was filtered and washed with 10 cc. of alcohol, the wash alcohol being then added to the filtrate from the salt filtration step. The alcohol was distilled from the combined solution.

The residue remaining after removal of the alcohol was distilled under high vacuum. Benzyl alcohol and N,N-beta,beta'-diethanolamine fractions, as in Example I, were obtained. There then remained in the distilling flask crude N-octadecyl N,N-beta,beta'-diethanolamine as a waxy, brown mass. This was distilled under 5 mm. Hg pressure and 27 grams of substantially pure N-octadecyl N,N-beta,beta'-diethanolamine was obtained as a brownish colored waxy mass boiling at 260°–285° C. It had a congealing point of 45° C. and a melting point of 46° C.

The crude and pure N-octadecyl N,N-beta,-beta'-diethanolamine is difficultly soluble in dilute mineral acids but forms readily soluble quaternary compounds with dimethyl sulfate. N-octadecyl, N,N-beta,beta'-diethanolamine may be used as a textile agent and may be converted into numerous quaternary ammonium compounds having germicidal properties.

EXAMPLE IV

Preparation of N-octadecyl N,N-beta,beta'-diethanolamine

Substantially the same results as those of Example III are obtained if 50 cc. of tetrahydrofurfuryl alcohol are used in place of the 50 cc. of benzyl alcohol employed in Example III.

EXAMPLE V

Preparation of N-octyl N,N-beta,beta'-diethanolamine 29 grams of octyl bromide, 32 grams of N,N-beta,beta'-diethanolamine and 40 cc. of benzyl alcohol were refluxed for ten minutes. After the contents were cooled to 100° C., 6 grams of sodium hydroxide in 10 cc. of water were added, followed by the addition of 50 cc. of ethyl alcohol.

The contents were refluxed for three minutes, and the ethyl alcohol then was removed by distillation. The salt was filtered off, washed with 5 cc. of benzyl alcohol and the wash liquid was combined with the main liquid part.

Benzyl alcohol and N,N-beta,beta'-diethanolamine were separated by distillation at a pressure of 4 mm. of mercury. Octyl diethanolamine was obtained as a fraction boiling at 170°–180° C. in a yield of 29.6 grams. It has an index of refraction of 1.4651 at 20° C. and is a colorless oil, insoluble in water, soluble in alcohol and dilute mineral acids.

N-octyl N,N-beta,beta'-diethanolamine may be used as a textile agent and can also be converted into quaternary ammonium compounds having germicidal properties.

EXAMPLE VI

*Preparation of a mixture of N-alkyl,N,N-beta, beta'-diethanolamines having 8,12,14,16 and 18 carbon atoms in the alkyl chain*

102.4 grams of a mixture having a boiling range of 105°–170° C. at a pressure of 5 mm. of mercury and consisting of about 60% of lauryl chloride and 10% each of octyl chloride, myristyl chloride, stearyl chloride and octadecyl chloride, and 106 grams of N,N-beta,beta'-diethanolamine were refluxed for ten minutes under atmospheric pressure in the presence of 200 cc. of mono-methyl ether of diethylene glycol.

There was then added a solution of 20 grams of sodium hydroxide in 20 cc. of water and then 100 cc. of isopropyl alcohol. The contents were refluxed for twenty minutes.

After standing over night, the salt which had formed was filtered off, and washed with 20 cc. of isopropyl alcohol, the wash alcohol being added to the filtrate from the salt filtration step. The isopropyl alcohol was then distilled from the combined solution.

The residue remaining after removal of the alcohol was distilled under high vacuum. Fractions containing substantially all the mono-methyl ether of diethylene glycol were obtained. When the distillation had been carried to the point where the temperature of the vapors in the distilling flask reached 150° C. at 4 mm. Hg pressure, the residue still remaining in the flask consisted essentially of a mixture of N-alkyl N,N-beta,beta'-diethanolamines. This residue, upon distillation, gave 127 grams of a slightly brown, thick oil boiling between 185°–230° C. under 4 mm. Hg pressure. This distillate is soluble in dilute mineral acids and may be employed per se as a textile agent or it may be converted into quaternary ammonium compounds and used as germicides.

EXAMPLE VII

*Preparation of N-lauryl N, N-beta,beta'-di-isopropanolamine*

20.5 grams of lauryl chloride, 27 grams of N,N-beta,beta'-di-isopropanolamine $$HN(CH_2CHCH_3OH)_2$$

and 40 cc. of benzyl alcohol were refluxed for ten minutes under atmospheric pressure.

After cooling the contents to 100° C., 4 grams of sodium hydroxide in 10 cc. of water were added, followed by the addition of 50 cc. of ethyl alcohol.

The contents were refluxed for three minutes and permitted to cool to room temperature (25° C.). The salt was filtered off, washed with 10 cc. of ethyl alcohol and the wash combined with the main liquid part.

The alcohol was removed by atmospheric distillation and the benzyl alcohol and N,N-beta,beta'-diisopropanolamine were removed by distillation under a pressure of 4 mm. of mercury by conducting the distillation until the temperature rose to 187° C.

N-lauryl N,N-beta,beta'-di-isopropanolamine was obtained in a yield of 26 grams as a fraction boiling between 188°–198° C. It has an index of refraction (20° C.) of 1.4592, is a yellow oil, and is easily soluble in dilute mineral acids.

The foregoing illustrates the practice of this invention, which however, is not to be limited thereby, but is to be construed as broadly as permissible in view of the prior art and limited solely by the appended claims.

I claim:

1. The process for preparing compounds having the formula,

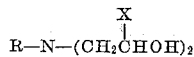

wherein R is an alkyl group having eight to eighteen carbon atoms, and X is a member selected from the group consisting of H and CH$_3$, which comprises heating a substance having the formula, R halogen together with a material having the formula,

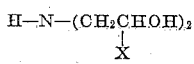

in the presence of a material selected from the group consisting of benzyl alcohol, tetrahydro furfuryl alcohol, the mono-methyl ether of diethylene glycol, the mono-ethyl ether of diethylene glycol, phenyl ethyl alcohol, the lower alkyl ring-substituted benzyl alcohols, beta-hydroxyethyl phenyl ether, mono-butyl ether of diethylene glycol, mono ethyl butyl ether of ethylene glycol, and mono-butyl ether of ethylene glycol.

2. The process for preparing compounds having the formula,

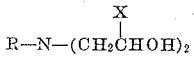

wherein R is an alkyl group having eight to eighteen carbon atoms, and X is a member selected from the group consisting of H and CH$_3$, which comprises heating under reflux at atmospheric pressure a substance having the formula, R halogen together with a material having the formula,

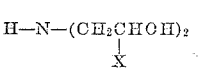

in the presence of a material selected from the group consisting of benzyl alcohol, tetrahydro furfuryl alcohol, the mono methyl ether of diethylene glycol, the mono-ethyl ether of diethylene glycol, phenyl ethyl alcohol, the lower alkyl ring-substituted benzyl alcohols, beta-hydroxyethyl phenyl ether, mono-butyl ether of diethylene glycol, mono ethyl butyl ether of ethylene glycol, and mono-butyl ether of ethylene glycol.

3. The process for preparing compounds having the formula,

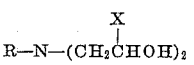

wherein R is an alkyl group having eight to eighteen carbon atoms, and X is a member selected from the group consisting of H and CH$_3$, which comprises heating under reflux at atmospheric pressure a substance having the formula, $$RCl$$

together with a material having the formula, $$H-N-(CH_2CHOH)_2$$
$$\phantom{H-N-}|$$
$$\phantom{H-N-}X$$

in the presence of a material selected from the group consisting of benzyl alcohol, tetrahydro furfuryl alcohol, the mono-methyl ether of diethylene glycol, the mono-ethyl ether of diethylene glycol, phenyl ethyl alcohol, the lower alkyl ring-substituted benzyl alcohols, beta-hydroxyethyl phenyl ether, mono-butyl ether of diethylene glycol, mono ethyl butyl ether of ethylene glycol, and mono-butyl ether of ethylene glycol.

4. The process for preparing compounds having the formula, $$\phantom{R-N-(CH_2}X$$
$$\phantom{R-N-(CH_2}|$$
$$R-N-(CH_2CHOH)_2$$

wherein R is an alkyl group having eight to eighteen carbon atoms, and X is a member selected from the group consisting of H and CH₃, which comprises heating under reflux at atmospheric pressure a substance having the formula, $$RBr$$

together with a material having the formula, $$H-N-(CH_2CHOH)_2$$
$$\phantom{H-N-}|$$
$$\phantom{H-N-}X$$

in the presence of a material selected from the group consisting of benzyl alcohol, tetrahydrofurfuryl alcohol, the mono-methyl ether of diethylene glycol, the mono-ethyl ether of diethylene glycol, phenyl ethyl alcohol, the lower alkyl ring-substituted benzyl alcohols, beta-hydroxyethyl phenyl ether, mono-butyl ether of diethylene glycol, mono ethyl butyl ether of ethylene glycol, and mono-butyl ether of ethylene glycol.

5. The process for preparing compounds having the formula, $$\phantom{R-N-(CH_2}X$$
$$\phantom{R-N-(CH_2}|$$
$$R-N-(CH_2CHOH)_2$$

wherein R is an alkyl group having eight to eighteen carbon atoms, and X is a member selected from the group consisting of H and CH₃, which comprises heating under reflux at atmospheric pressure about 1 mol of a substance having the formula $$R\ halogen$$

together with about 2 mols of a material having the formula, $$H-N-(CH_2CHOH)_2$$
$$\phantom{H-N-}|$$
$$\phantom{H-N-}X$$

in the presence of a material selected from the group consisting of benzyl alcohol, tetrahydro furfuryl alcohol, the mono-methyl ether of diethylene glycol, the mono-ethyl ether of diethylene glycol, phenyl ethyl alcohol, the lower alkyl ring-substituted benzyl alcohols, beta-hydroxyethyl phenyl ether, mono-butyl ether of diethylene glycol, mono ethyl butyl ether of ethylene glycol, and mono-butyl ether of ethylene glycol.

6. The process for preparing compounds having the formula, $$R-N-(CH_2CH_2OH)_2$$

wherein R is an alkyl group having eight to eighteen carbon atoms, which comprises heating under reflux at atmospheric pressure about 1 mol of a substance having the formula, $$R\ halogen$$

together with about 2 mols of N,N-beta,beta'-diethylanolamine, in the presence of benzyl alcohol.

7. The process for preparing compounds having the formula, $$R-N-(CH_2CH_2OH)_2$$

wherein R is an alkyl group having eight to eighteen carbon atoms, which comprises heating under reflux at atmospheric pressure about 1 mol of a substance having the formula, $$R\ halogen$$

together with about 2 mols of N,N-beta,beta'-diethanolamine, in the presence of tetrahydro furfuryl alcohol.

8. The process for preparing compounds having the formula, $$R-N-(CH_2CH_2OH)_2$$

wherein R is an alkyl group having eight to eighteen carbon atoms, which comprises heating under reflux at atmospheric pressure about 1 mol of a substance having the formula, $$R\ halogen$$

together with about 2 mols of N,N-beta,beta'-diethanolamine, in the presence of the monomethyl ether of diethylene glycol.

9. The process for preparing N-lauryl-N,N-beta,beta'-diethanolamine, which comprises heating under reflux at atmospheric pressure about 1 mol of lauryl chloride with about 2 mols of N,N-beta, beta'-diethanolamine, in the presence of benzyl alcohol.

10. The process for preparing N-lauryl N,N-beta,beta'-diisopropanolamine, which comprises heating under reflux at atmospheric pressure lauryl chloride with N,N-beta,beta'-diisopropanolamine in the presence of benzyl alcohol.

EDWARD JOSEPH NIKAWITZ.

REFERENCES CITED

The following references are of record in the file of this patent:

UNITED STATES PATENTS

| Number | Name | Date |
|---|---|---|
| 1,836,047 | Somerville | Dec. 15, 1931 |
| 1,836,048 | Somerville | Dec. 15, 1931 |

OTHER REFERENCES

Pierce et al.: "J. Am. Chem. Soc.," 64, pages 1691–1694 (1942).

Rumpf et al.: "Bull. Soc. Chim.," 10, pages 537–349 (1943).